United States Patent [19]

Sagvik et al.

[11] Patent Number: 5,752,909
[45] Date of Patent: May 19, 1998

[54] HEMMING METHOD AND APPARATUS

[75] Inventors: Ragnar Harald Sagvik, Lier; Lars Lyngaas, Haslum, both of Norway

[73] Assignee: Elopak Systems AG, Glattbrugg, Switzerland

[21] Appl. No.: 693,137

[22] PCT Filed: Feb. 21, 1995

[86] PCT No.: PCT/IB95/00113

§ 371 Date: May 12, 1997

§ 102(e) Date: May 12, 1997

[87] PCT Pub. No.: WO95/23061

PCT Pub. Date: Aug. 31, 1995

[30] Foreign Application Priority Data

Feb. 23, 1994 [GB] United Kingdom ............... 9403476

[51] Int. Cl.⁶ .......................... B31F 7/00; B29C 65/00
[52] U.S. Cl. ........................ 493/405; 493/136; 493/138; 493/162; 493/360; 493/357; 493/363; 493/72
[58] Field of Search ........................ 493/56, 59, 60, 493/61, 64, 136, 137, 138, 139, 156, 157, 158, 159, 160, 161, 162, 405, 360, 357, 363, 355, 409, 72, 135, 144, 356, 358, 359, 361, 362, 365, 366, 370

[56] References Cited

U.S. PATENT DOCUMENTS

| 3,800,677 | 4/1974 | Jones . | |
| 4,540,391 | 9/1985 | Fries | 493/287 |
| 4,617,211 | 10/1986 | Fries | 428/35 |
| 4,708,708 | 11/1987 | Fries | 493/357 |
| 4,740,163 | 4/1988 | Kuchenbecker | 493/56 |
| 4,757,936 | 7/1988 | Homma | 229/5.5 |
| 4,927,075 | 5/1990 | Lisiecki . | |
| 4,931,031 | 6/1990 | Lisiecki | 493/355 |
| 4,979,932 | 12/1990 | Burnside | 493/134 |
| 5,114,392 | 5/1992 | McAdam | 493/179 |
| 5,207,632 | 5/1993 | Brunlid | 493/355 |
| 5,236,408 | 8/1993 | McAdam | 493/60 |
| 5,251,809 | 10/1993 | Drummond | 493/276 |
| 5,385,527 | 1/1995 | Fukada | 493/135 |

Primary Examiner—Joseph J. Hail, III
Assistant Examiner—Christopher W. Day
Attorney, Agent, or Firm—Reising, Ethington, Barnard & Perry

[57] ABSTRACT

A skiving method comprises forming by milling, along an edge zone of a packaging blank comprised of a liquid-absorbent layer and at least two liquid-barrier layers thereon, a tongue, a recess inwardly of the tongue, a land inwardly of the recess, and a groove inwardly of the land, folding over the edge zone to insert the tongue into the groove, and sealing the edge zone to the remainder of the sheet material, preferably by mechanical pressure alone.

28 Claims, 3 Drawing Sheets

HEMMING METHOD AND APPARATUS

TECHNICAL FIELD

This invention relates to a method of and apparatus for hemming an edge of sheet material.

BACKGROUND ART

In the field of liquid packaging it is known to employ as the packaging material a laminate consisting of, for example, paperboard coated on both faces with layers comprised of other substances, for example a barrier substance. The barrier substance may be a barrier to liquid, particularly water, such as PE, or barrier to oxygen, such as aluminium or EVOH. The two surface layers of the laminate are usually of a substance or substances such that the two layers can be heat-sealed together during forming of a liquid packaging carton. The cartons may be constructed from blanks individually cut from a web of the laminate. The cutting-out of the blanks leaves cut edges via which liquid or gas could penetrate into the paperboard and leak into or out of the carton, were it not for hemming of the cut edge, such as by skiving, i.e. milling-away, of a portion of the cut edge and folding-over of the edge zone and heat-and pressure-sealing of the folded-over edge zone to the remainder of the blank to cover the otherwise exposed paperboard with a barrier layer. Such hemming of the cut edge is disclosed in, for example, U.S. Pat. No. 3,654,842 and U.S. Pat. No. 5,236,408. A problem encountered with known hemming is that the folded-over edge zone tends to return to its original pre-folding condition, and so may not be completely and correctly heat-and pressure-sealed to the remainder of the blank.

DISCLOSURE OF INVENTION

According to one aspect of the present invention, there is provided a hemming method comprising forming, so as to extend along a free edge zone of sheet material comprised of a fluid-absorbent layer and a fluid-barrier layer thereon, a tongue upstanding substantially perpendicularly to a plane of said sheet material, a recess inwardly of said tongue, a land inwardly of said recess, and a groove inwardly of said land, folding-over said edge zone, inserting said tongue in said groove and sealing said edge zone to the remainder of the sheet material.

According to another aspect of the present invention, there is provided apparatus for hemming a free edge zone of sheet material comprised of a fluid-absorbent layer and a fluid-barrier layer thereon, characterized by forming means for forming a recess extending along said edge zone and spaced inwards of the free edge of said edge zone, thereby to leave a tongue extending along said edge zone outwards of said recess and for forming a groove extending along said edge zone and spaced inwards of said recess, thereby to leave a land extending along said edge zone outwards of said groove, folding means for folding-over said edge zone to cause said tongue to enter said groove, and sealing means for sealing said edge zone to the remainder of said sheet material.

Owing to the tongue-in-groove joint, the hemmed edge zone can be made more reliably fluid-proof. Moreover, the use of heat in the sealing can be dispensed with, and the seal be obtained purely mechanically by simply squeezing together the parts of the tongue-in-groove joint.

The sheet material can be in the form of a continuous web or an individual blank.

BRIEF DESCRIPTION OF DRAWINGS

In order that the invention may be more clearly understood and readily carried into effect, reference will now be made, by way of example, to the accompanying drawings, in which.

BEST MODE FOR CARRYING OUT THE INVENTION

Figure 1:
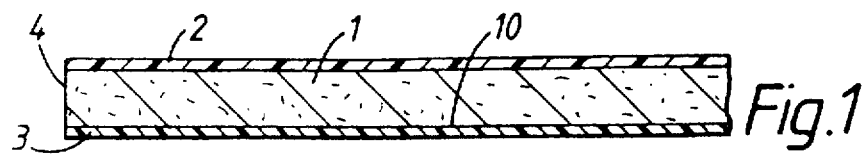
FIG. 1 shows a cross-section through an edge region of a cut-out blank of a liquid-packaging laminate of a first kind.

Referring to FIG. 1, the blank, from which a gable-topped or flat-topped liquid-packaging carton is to be made, is a laminate comprised of a layer 1 of paperboard coated on both faces with layers 2 and 3 of thermoplastics, for example polyethylene, of which the layer 2 is intended to provide the inner surface and the layer 3 is intended to provide the outer surface of the carton. If so desired, the laminate may include one or more additional layers, for example a gas barrier layer, such as EVOH or aluminium. The blank has a cut edge 4 at which the paperboard 1 is exposed so that, if the blank were to be folded and sealed to form a carton with that cut edge 4 at the inside of the carton and thus exposed to the liquid, for example milk, in the carton, the liquid would be able to penetrate into the paperboard and weaken the same and/or leak out through the same. It is in order to prevent such penetration that the cut edge 4 is skived and then pressure-sealed.

Figure 2:
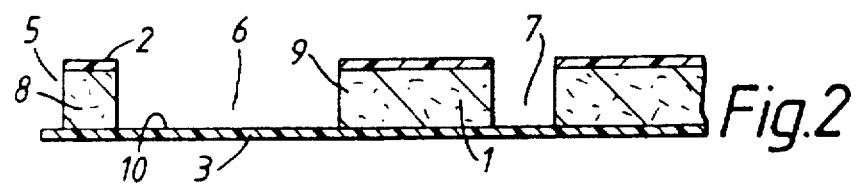
FIG. 2 is a view similar to FIG. 1, but with the edge region milled away to a desired profile.

Referring to FIG. 2, parallelly to the edge 4 are milled a rectangular cut-away 5, a rectangular recess 6 and a rectangular groove 7, thus leaving thereamong a rectangular tongue 8 and a rectangular land 9. In forming the items 5 to 7, the layers 1 and 2 are milled away to substantially the hidden surface 10 of the layer 3 so as substantially to expose the same. The recess 6 is of a width slightly greater than the sum of the height and the width of the land 9, whilst the width of the tongue is slightly less than that of the groove 7.

Figure 3:
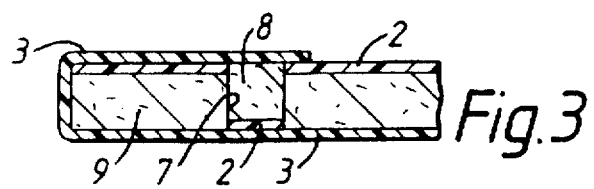
FIG. 3 is a view similar to FIG. 1, but with the relevant edge zone folded-over and pressure-sealed to the remainder of the blank.

Referring to FIG. 3, the tongue 8 and the portion of the layer 3 between the edge 4 and the land 9 have been turned over the land 9 and the tongue 8 inserted in the groove 7. The tongue-in-groove joint 7, 8 serves to prevent the folded-over edge zone from moving back towards its pre-folding condition prior to pressure-sealing thereof to the remainder of the blank. On such sealing, the portion of the layer 3 seen between the tongue 8 and the land 9 in FIG. 2 is pressed sealingly against the portion of the layer 2 included in the land 9, the substantially exposed portion of the layer 3 in the groove 7 is pressed sealingly against the portion of the layer 2 included in the tongue 8, whilst the portion of the layer 3 projecting beyond the tongue 8 is pressed sealingly against the portion of the layer 2 in the remainder of the blank.

Figure 4:
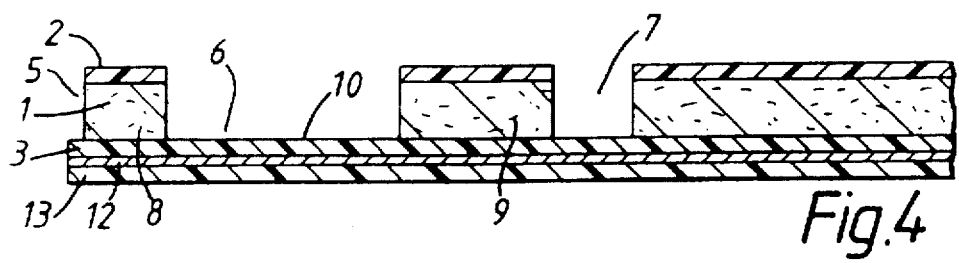
FIG. 4 is a view similar to FIG. 2, but of an edge region of a cut-out blank of a liquid-packaging laminate of a second kind.
Figure 5:
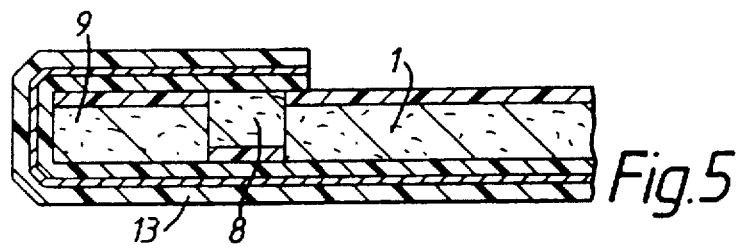
FIG. 5 is a view similar to FIG. 3, but of the blank of FIG. 4.
Figure 6:
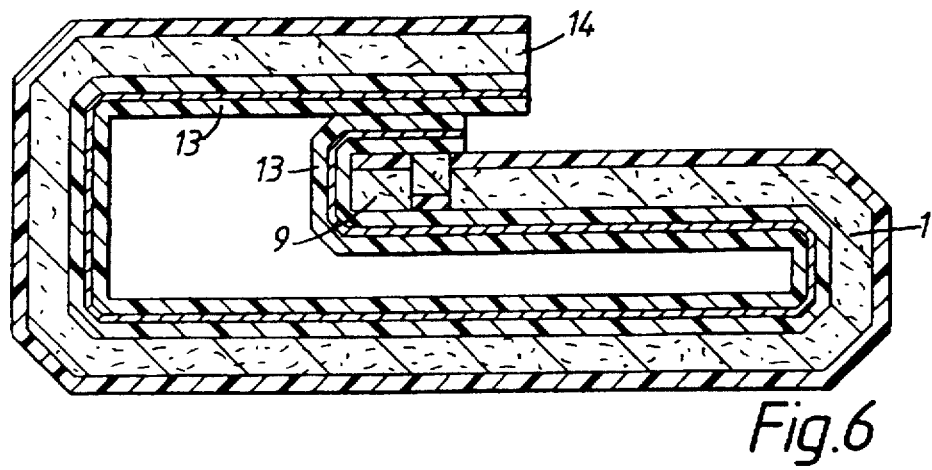
FIG. 6 is a diagrammatic cross-section through a liquid packaging carton made from the blank of FIGS. 4 and 5.

Referring to FIGS. 4 to 5, the blank is a laminate comprised of the layer 1 of paperboard coated on both faces with the thermoplastics layers 2 and 3, but with a gas barrier layer 12 of, for example aluminium or EVOH, covering the layer 2 and a layer 13 of thermoplastics, for example polyethylene, covering the layer 12. Again, to form the items 5 to 7, the layers 1 and 2 are milled away to substantially the surface 10. Folding-over and pressure-sealing are performed as for the embodiment of FIGS. 1 to 3, to give the liquid-proof edge shown in FIG. 5. As shown in FIG. 6, the opposite edge zone 14 of the blank is pressure-sealed to the edge of FIG. 5, with the layer 13, in particular, being sealed to itself, so that the barrier layer 12 substantially completely encircles the interior of the carton.

Figure 7:
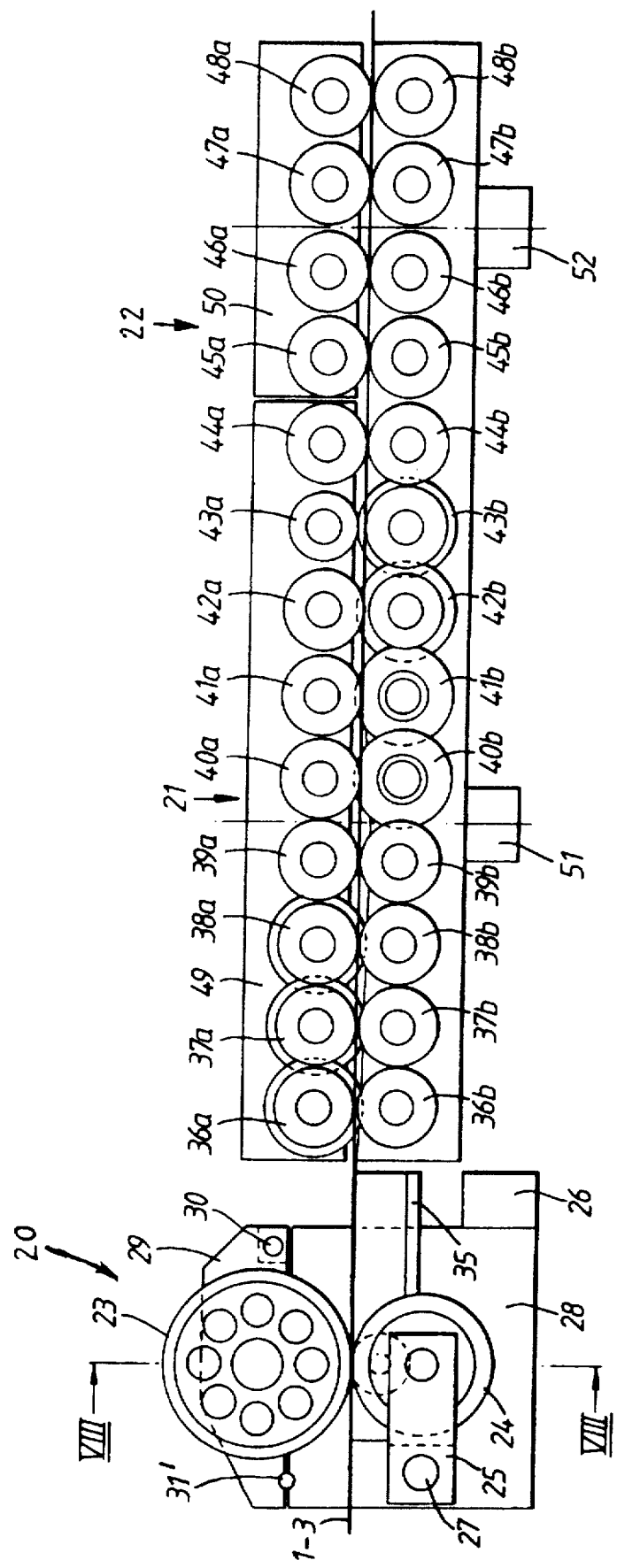
FIG. 7 is a diagrammatic side elevation of an apparatus forming on the blank the edge zone of FIG. 3 or 5.
Figure 8:
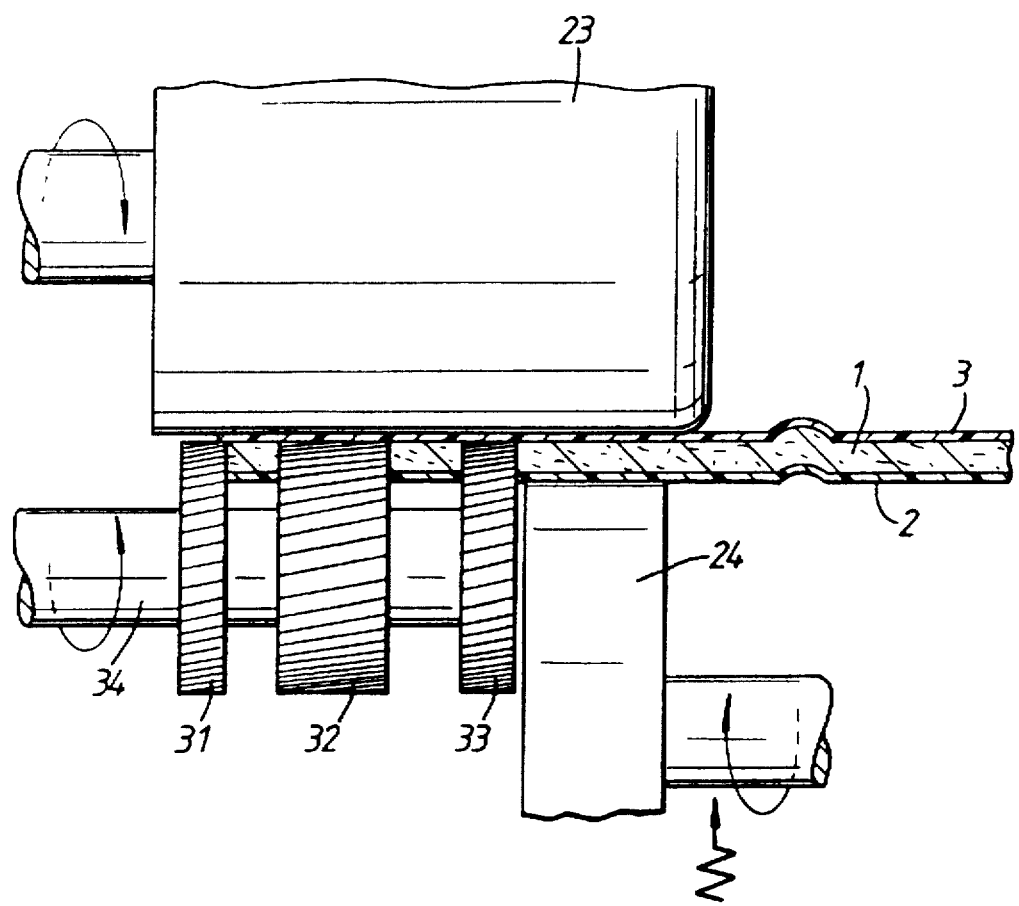
FIG. 8 shows a diagrammatic, fragmentary section taken on the line VIII—VIII of FIG. 7, with the apparatus forming the edge zone of FIG. 3.

Referring to FIGS. 7 and 8, the apparatus includes a milling station 20 followed by a folding-over station 21 and a sealing station 22. At the milling station 20 are two driven horizontal rolls 23 and 24 which grippingly advance the blank 1–3 between them, the lower roll, 24, being rotatably mounted upon a turntable arm 25 urged resiliently upwardly by a pneumatic piston-and-cylinder device 26 about a horizontal pivot 27 on a casing 28. The roll 23 is rotatably mounted on an arm 29 turnable about a horizontal pivot 30 on the casing 28. A conical pin 31' effective between the casing 28 and the arm 29 permits adjustment for differing thicknesses of laminate. Three horizontal cylindrical milling cutters 31 to 33 fixed to a horizontal drive shaft 34 form in the blank the cut-away 5, the recess 6 and the groove 7, respectively. A suction mouthpiece 35 removes the debris resulting from the milling. A series of pairs of upper and lower driven rolls 36a, 36b to 44a, 44b advance the blank between them, while bringing the tongue 8 and the portion of the layer 3 between the edge 4 and the land 9 in stages to a stage in which the tongue 8 is received in the groove 7. A series of pairs of upper and lower driven rolls 45a, 45b to 48a, 48b then advance the blank between them, while squeezing the edge zone, thereby mechanically to jam the tongue 8 into the groove 7, to seal the edge zone. The upper rolls 36a to 44a are mounted upon a support 49, whilst the upper rolls 45a to 48a are mounted upon a separate support 50. The two supports 49 and 50 are acted upon by respective pneumatic piston-and-cylinder devices 51 and 52 which serve to maintain constant nip pressures for the folding rolls 36 to 44 and for the sealing rolls 45 to 48.

Although the sealing station (45 to 48) could employ heat as well as pressure for sealing of the edge zone, a particular advantage of the system described with reference to the drawings is that the use of heat is dispensed with and the system relies upon mechanical pressure to produce the sealing effect. Thus, the additional running and maintenance costs involved in the use of heat can be avoided.

INDUSTRIAL APPLICABILITY

The present invention is particularly applicable to the packaging field, especially to webs or blanks from which gable-top or flat-top, liquid-packaging cartons are to be produced.

We claim:

1. A hemming method comprising providing sheet material comprised of a fluid-absorbent layer and a fluid-barrier layer, forming, so as to extend along a free edge zone of said sheet material, a tongue upstanding substantially perpendicularly to a plane of said fluid-barrier layer, a recess laterally inwardly of said tongue, a land laterally inwardly of said recess, and a groove laterally inwardly of said land, folding said fluid barrier layer over said land, inserting said tongue in said groove and sealing said edge zone to the remainder of the sheet material.

2. A method according to claim 1, wherein said tongue, said recess, said land, and said groove are substantially rectangular.

3. A method according to claim 1, wherein said recess is of a width slightly greater than the sum of the height and the width of the land.

4. A method according to claim 1, wherein the width of the tongue is slightly less than that of the groove.

5. A method according to claim 1, wherein, in forming said recess and said groove, sections of said fluid-absorbent layer are removed to substantially a hidden surface of the fluid-barrier layer.

6. A method according to claim 5, wherein said sheet material includes a second fluid-barrier layer, with the fluid-absorbent layer being disposed between the first-mentioned and the second fluid-barrier layers, sections of said second fluid-barrier layer being removed in forming said recess and said groove.

7. A method according to claim 6, wherein, in the sealing of said edge zone to the remainder of the sheet material, the portion of the first-mentioned fluid-barrier layer between the tongue and the land is sealed to the portion of the second fluid-barrier layer included in the land.

8. A method according to claim 6, wherein, in the sealing of said edge zone to the remainder of the sheet material, the substantially exposed portion of the first-mentioned fluid barrier layer in the groove is sealed to the portion of the second fluid-barrier layer included in the tongue.

9. A method according to claim 6, wherein the first-mentioned and the second fluid-barrier layers constitute barriers to liquid, and the sheet material includes a gas barrier layer, the first-mentioned fluid barrier layer being disposed between the fluid absorbent layer and the gas barrier layer.

10. A method according to claim 1, wherein said sealing is produced by mechanical pressure alone on said edge zone.

11. A method according to claim 1, and further comprising, prior to the folding-over of said edge zone, forming, along said edge zone, a cut-away outwardly of said tongue and extending to the outer edge of said edge zone.

12. A method according to claim 11, wherein said tongue, said recess, said land, said groove and said cut-away are substantially rectangular.

13. A method according to claim 1, wherein said recess is of a width slightly greater than the sum of the height and the width of the land.

14. A method according to claim 11, wherein the width of the tongue is slightly less than that of the groove.

15. A method according to claim 11, wherein said sealing is produced by mechanical pressure alone on said edge zone.

16. A method according to claim 11, wherein, in forming said recess, said groove and said cut-away, sections of said fluid-absorbent layer are removed to substantially a hidden surface of the fluid-barrier layer.

17. A method according to claim 16, wherein said sheet material includes a second fluid-barrier layer, with the fluid-absorbent layer being disposed between the first-mentioned and the second fluid-barrier layers, sections of said second fluid-barrier layer being removed in forming said recess, said groove and said cut-away.

18. A method according to claim 17, wherein, in the sealing of said edge zone to the remainder of the sheet material, the portion of the first-mentioned fluid-barrier layer between the tongue and the land is sealed to the portion of the second fluid-barrier layer included in the land.

19. A method according to claim 17, wherein, in the sealing of said edge zone to the remainder of the sheet material, the substantially exposed portion of the first-mentioned fluid barrier layer in the groove is sealed to the portion of the second fluid-barrier layer included in the tongue.

20. A method according to claim 17, wherein, in the sealing of said edge zone to the remainder of the sheet material, the substantially exposed portion of the first-mentioned fluid-barrier layer in the cut-away is sealed to the portion of the second fluid-barrier layer in the remainder of the blank.

21. A method according to claim 17, wherein the first-mentioned and the second fluid-barrier layers constitute barriers to liquid, and the sheet material includes a gas barrier layer, the first-mentioned fluid barrier layer being disposed between the fluid absorbent layer and the gas barrier layer.

22. Apparatus for hemming a free edge zone of sheet material comprised of a fluid-absorbent layer and a fluid-barrier layer thereon, comprising means for supplying said sheet material comprised of a fluid-absorbent layer and a fluid-barrier layer, forming means for forming a recess extending along said edge zone and spaced laterally inwards of a free edge of said edge zone, thereby to leave a tongue extending along said edge zone outwards of said recess and for forming a groove extending along said edge zone and spaced laterally inwards of said recess, thereby to leave a land extending along said edge zone laterally outwards of said groove, folding means for folding said fluid barrier layer over said land to cause said tongue to enter said groove, and sealing means for sealing said edge zone to the remainder of said sheet material.

23. Apparatus according to claim 22, wherein said forming means comprises a plurality of rotary milling cutters.

24. Apparatus according to claim 23, wherein said milling cutters are fixed to a common drive shaft.

25. Apparatus according to claim 22, and further comprising a pair of rolls arranged to grip between them a portion of said edge zone adjacent said milling cutters and to advance said edge zone, while said milling cutters form said recess and said groove.

26. Apparatus according to claim 22, wherein said folding means and said sealing means consist of respective groups of pairs of rolls.

27. Apparatus according to claim 26, and further comprising a support mounting one roll of each pair of the group of folding rolls and a separate support mounting one roll of each pair of the group of sealing rolls, and first and second urging means which urge the respective supports in a sense to increase the nip pressures of the respective groups of folding rolls and sealing rolls.

28. Apparatus according to claim 27, wherein said urging means serves to maintain substantially constant the nip pressures of the respective groups of folding rolls and sealing rolls.

* * * * *